United States Patent
Ozaki et al.

(10) Patent No.: US 6,377,007 B1
(45) Date of Patent: Apr. 23, 2002

(54) MOTOR TORQUE CONTROL DEVICE OF ELECTRIC VEHICLE

(75) Inventors: Masahito Ozaki; Kazunori Handa, both of Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/610,054

(22) Filed: Jul. 5, 2000

(30) Foreign Application Priority Data

Jul. 5, 1999 (JP) .......................................... 11-190194

(51) Int. Cl.[7] .............................................. H02P 7/00
(52) U.S. Cl. ..................... 318/432; 318/139; 318/254; 318/266; 318/430; 318/431; 318/433; 318/434; 318/560; 318/630
(58) Field of Search ................................. 318/430–434, 318/630, 139, 254, 266, 560, 370, 389; 180/65.2, 65.1, 65.4, 167, 168, 169; 303/152, 155, 113.4, 191, 192

(56) References Cited

U.S. PATENT DOCUMENTS

| | | | | | |
|---|---|---|---|---|---|
| 5,457,363 A | * | 10/1995 | Yoshii et al. | ................ | 318/432 |
| 5,481,168 A | * | 1/1996 | Mutoh et al. | ................ | 318/432 |
| 5,905,349 A | * | 5/1999 | Farkas et al. | ................ | 318/432 |
| 5,973,463 A | * | 10/1999 | Okuda et al. | ................ | 318/430 |
| 6,072,293 A | * | 6/2000 | Shimizu et al. | ............. | 318/432 |
| 6,072,297 A | * | 6/2000 | Xu et al. | ..................... | 318/630 |
| 6,158,822 A | * | 12/2000 | Shirai et al. | .................... | 303/3 |

* cited by examiner

*Primary Examiner*—Robert E. Nappi
*Assistant Examiner*—Tyrone Smith
(74) *Attorney, Agent, or Firm*—Rossi & Associates

(57) ABSTRACT

A motor torque control device of an electric vehicle sets creep torque in accordance with a vehicle speed sensed by a vehicle speed sensor, and sets acceleration torque in accordance with an accelerator control input sensed by an acceleration sensor. Then, the motor torque control device calculates a torque command value by adding the creep torque to the acceleration torque. It is therefore possible to quickly raise the acceleration torque immediately when an accelerator is operated to start the vehicle. It is also possible to prevent a sharp decrease in the torque command value since the torque command value reflects the creep torque even after the start of the vehicle.

6 Claims, 2 Drawing Sheets

MOTOR TORQUE CONTROL DEVICE OF ELECTRIC VEHICLE

BACKGROUND OF THE INVENTION

1. Field of the Invention

The present invention relates to a motor torque control device of an electric vehicle (including a hybrid vehicle), which causes a creeping phenomenon.

2. Description of Related Art

A creeping phenomenon usually occurs in a vehicle having an internal combustion engine with an automatic transmission, in which the vehicle attempts to move or creeps slightly forward due to the transmission of torque through a torque converter while the vehicle is stopped. In contrast, an electric vehicle is ordinarily capable of arbitrarily stopping without the occurrence of the creeping phenomenon.

This creeping phenomenon, however, has advantages of easily moving the vehicle forward at a creep speed, preventing the vehicle from moving backward even when a driver changes the position of the foot from a brake pedal to an accelerator pedal to start the vehicle on an uphill slope or in similar circumstances. For this reason, the creeping phenomenon is considered to be favorable in view of the driver's driving operation. Since vehicles that are subject to the creeping phenomenon are widely used at present, vehicles that are not subject to the creeping phenomenon may give users a sense of incongruity.

Accordingly, an electric vehicle has been proposed that positively causes the creeping phenomenon. As is well known, an electric vehicle controls torque (driving torque) of a motor according to a torque command value set in accordance with an accelerator control input to thereby acquire a driving force in conformity with the operation of an accelerator. Therefore, when the accelerator control input is in the vicinity of zero, the torque command value is also zero. That is why a creep force usually cannot be acquired in an electric vehicle.

To address this problem, when the accelerator control input is in the vicinity of zero, a predetermined creep torque is set as the torque command value in order to acquire the creep force.

In this case, if the accelerator control input is increased from zero with the start of the vehicle, the torque command value is switched from the creep torque to a value (hereinafter referred to as acceleration torque) corresponding to the accelerator control input. A variety of ways have been proposed to control this switching operation. For example, the torque command value is switched from the creep torque to the acceleration torque when the accelerator control input is increased from zero. Alternatively, the torque command value is switched to the acceleration torque when the acceleration torque exceeds the creep torque.

In the former method, however, the acceleration torque is very close to zero at the moment the accelerator is pressed on. Thus, the torque command value is temporarily decreased from the creep torque to zero although the accelerator is operated. On a level road, a vehicle speed is lowered momentarily. On an uphill slope, the vehicle moves backward unexpectedly. It is therefore impossible to smoothly increase the vehicle speed. In the latter method, the predetermined creep torque is set as the torque command value until the acceleration torque exceeds the creep torque, and thus, the acceleration is delayed with respect to the operation of the accelerator, which gives an unnatural impression.

As a compromise between the above two methods, a value obtained by adding the creep torque to the acceleration torque is set as the power running torque command value until the acceleration torque exceeds the creep torque, and the torque command value is switched only to the acceleration torque when the acceleration torque exceeds the creep torque. More specifically, the power running torque command value reflects the acceleration torque from the start of the operation of the accelerator. This prevents the delay of the acceleration with respect to the operation of the accelerator. Since the torque command value is switched to the acceleration torque when the acceleration torque exceeds the creep torque, the torque command value can be prevented from being decreased to the vicinity of zero.

In the above compromise, however, the torque command value is decreased by the creep torque at the time of the switching. FIG. 2 shows the state wherein the vehicle is started on an uphill slope. In FIG. 2, the compromise is indicated by an alternate long and two short dashes line. As indicated by the alternate long and two short dashes line, the creep torque is decreased to zero at a point (a) when the acceleration torque exceeds the creep torque after the start of the vehicle, and therefore, the torque command value is sharply decreased. The decrease in the speed is less affected compared with the case where the creep torque is decreased to zero, because the torque command value, which is equal to the acceleration torque, still remains. However, it is impossible to smoothly increase the vehicle speed or to keep the vehicle from moving backward on a steep slope.

SUMMARY OF THE INVENTION

It is an object of the present invention to provide a motor torque control device of an electric vehicle, which enables smooth and natural acceleration in accordance with the operation of an accelerator at the start of the vehicle and the like.

The above object can be accomplished by providing an electric vehicle comprising: a shift position sensing device for sensing a shift position of a transmission mounted between a motor and driving wheels; a vehicle speed sensing device for sensing a vehicle speed; an accelerator sensing device for sensing an accelerator control input; a creep torque setting device for setting creep torque in accordance with a vehicle speed sensed by a vehicle speed sensing device when the shift position sensing device senses a running shift position an acceleration torque setting device for setting acceleration torque in accordance with the accelerator control input; a driving torque calculating device for calculating driving torque by adding the creep torque set by aid creep torque setting device to the acceleration torque set by the acceleration torque setting device; and a drive control device for running a motor in accordance with the driving torque calculated by the driving torque calculating device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment of a motor torque control device of an electric vehicle according to the present invention will be described hereinbelow.

Figure 1:
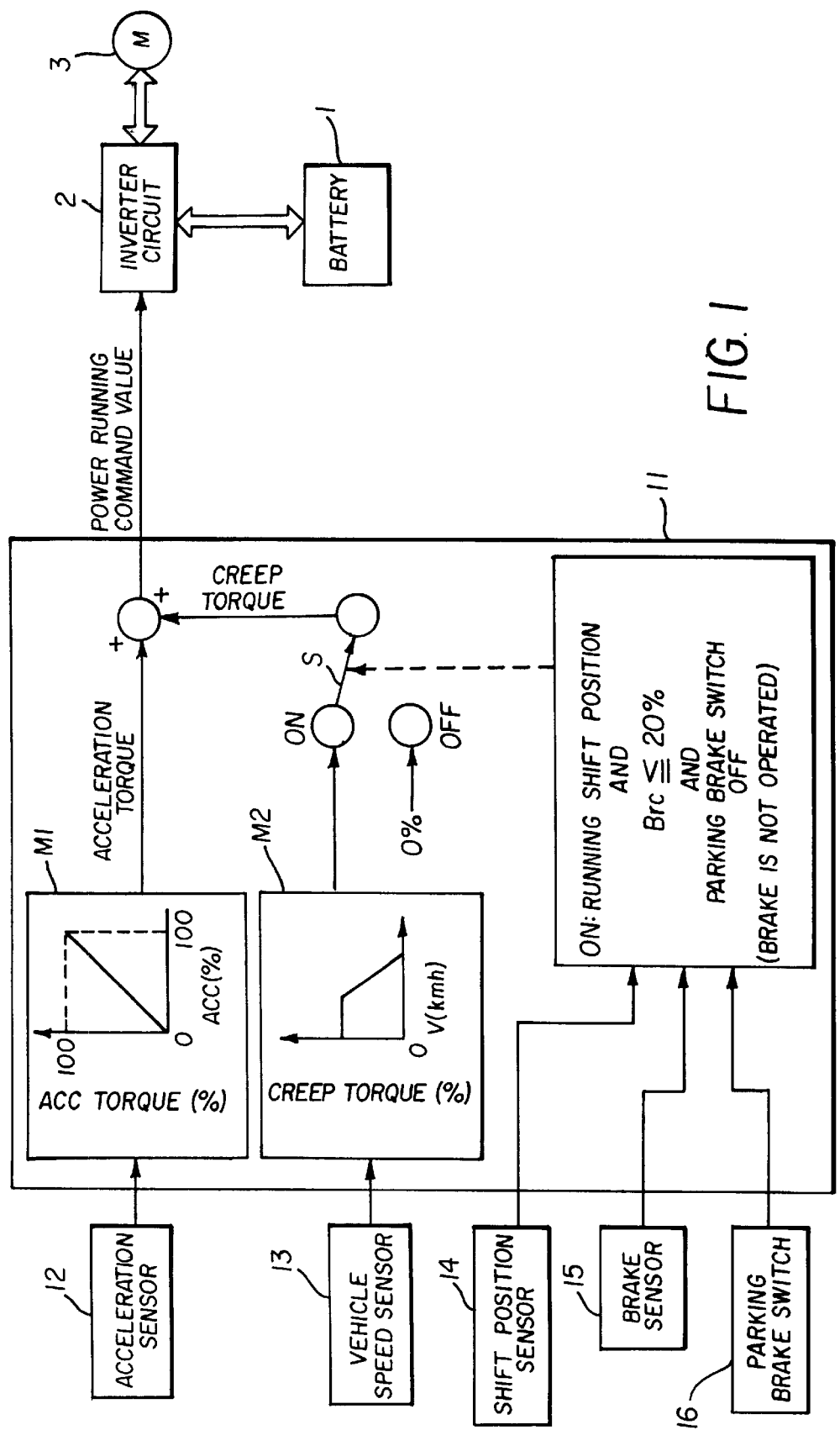
FIG. 1 is a block diagram showing the entire structure of a torque motor control unit of an electric motor.

FIG. 1 is a block diagram showing the entire structure of the motor torque control device. A battery 1 loaded in the vehicle is connected to a running motor 3 via an inverter circuit 2 as a drive control unit. Although not illustrated in the drawings, an output shaft of the motor 3 is connected to right and left driving wheels through a transmission, a differential gear, and the like. The inverter circuit 2 converts a power voltage from the battery 1 and supplies the power to the motor 3 according to a torque command value (described later in detail) 3. This controls torque (driving torque) and moves the vehicle. If the motor 3 is run backward by regenerative torque from the driving wheels as in the case when the vehicle is coasting, the inverter circuit 2 charges the battery 1 with power, that is generated by the motor 3.

On the other hand, an input/output device (not shown), a storage device (e.g., ROM, RAM and BURAM), a central processing unit (CPU), and an ECU (electronic control unit) 11 provided with a timer counter and the like are disposed within a cabin. An input side of the ECU 11 is connected to an acceleration sensor 12 as an accelerator control input device for sensing an accelerator control input Acc when a driver operates an accelerator, a vehicle speed sensor 13 for sensing a vehicle speed V, a shift position sensor 14 for sensing a shift position of the transmission such as a parking (P) position, a neutral (N) position, a drive (D) position and reverse (R) position selected by the driver, a brake sensor 15 for sensing a foot brake control input Brc when the driver operates a foot brake, a parking brake switch 16 for sensing an operating status of a parking brake, and other various kinds of sensors and switches. An output side of the ECU 11 is connected to the inverter 2 and a variety of actuators of the vehicle.

Next, a detailed description will be given of the procedure for controlling the torque of the motor by the motor torque control device of the electric vehicle, which is constructed in the above-mentioned manner, and more particularly, the procedure for setting the torque command value.

In FIG. 1, the procedure for setting the torque command value is conceptually described in the ECU 11. To calculate the torque command value, the ECU 11 uses the following two parameters: acceleration torque and creep torque. According to a map M1, the ECU 11 finds the acceleration torque based on the accelerator control input Acc sensed by the acceleration sensor 12 (an acceleration torque setting device). According to a map M2, the ECU 11 finds the creep torque based on the vehicle speed V sensed by the vehicle speed sensor 13 (a creep torque setting device). As is clear from FIG. 1, the acceleration torque is predetermined to increase from a starting point zero in proportion to the increase in the accelerator control input Acc. The creep torque is predetermined to be maintained at a fixed value in an extremely low vehicle speed range (about 0–3 km/h according to the present embodiment). The vehicle speed exceeds the extremely low vehicle speed range, the creep torque is predetermined to be reduced at a fixed ratio and then be maintained at zero.

On the other hand, the ECU 11 turns on a switch S in FIG. 1 on the condition that the shift position sensed by the shift position sensor 14 is the D position or the R position (i.e., a running shift position), the brake control input Brc sensed by the brake sensor 15 is less than 20% of the maximum control input, and the parking brake switch 16 is not operated. Consequently, a value, to which the creep torque set in the map M1 is added, is inputted as the power running torque command value to the inverter circuit 2 (a driving torque calculating device). If the shift position or the brake control input Brc does not satisfy the above condition, the ECU 11 turns off the switch S. At this time, the creep torque is set at zero regardless of the setting in the map M2, and thus, the acceleration torque is substantially inputted as the torque command value to the inverter circuit 2.

The setting of the torque command value in the above-mentioned manner causes the creep phenomenon as described below when the vehicle is running.

Figure 2:
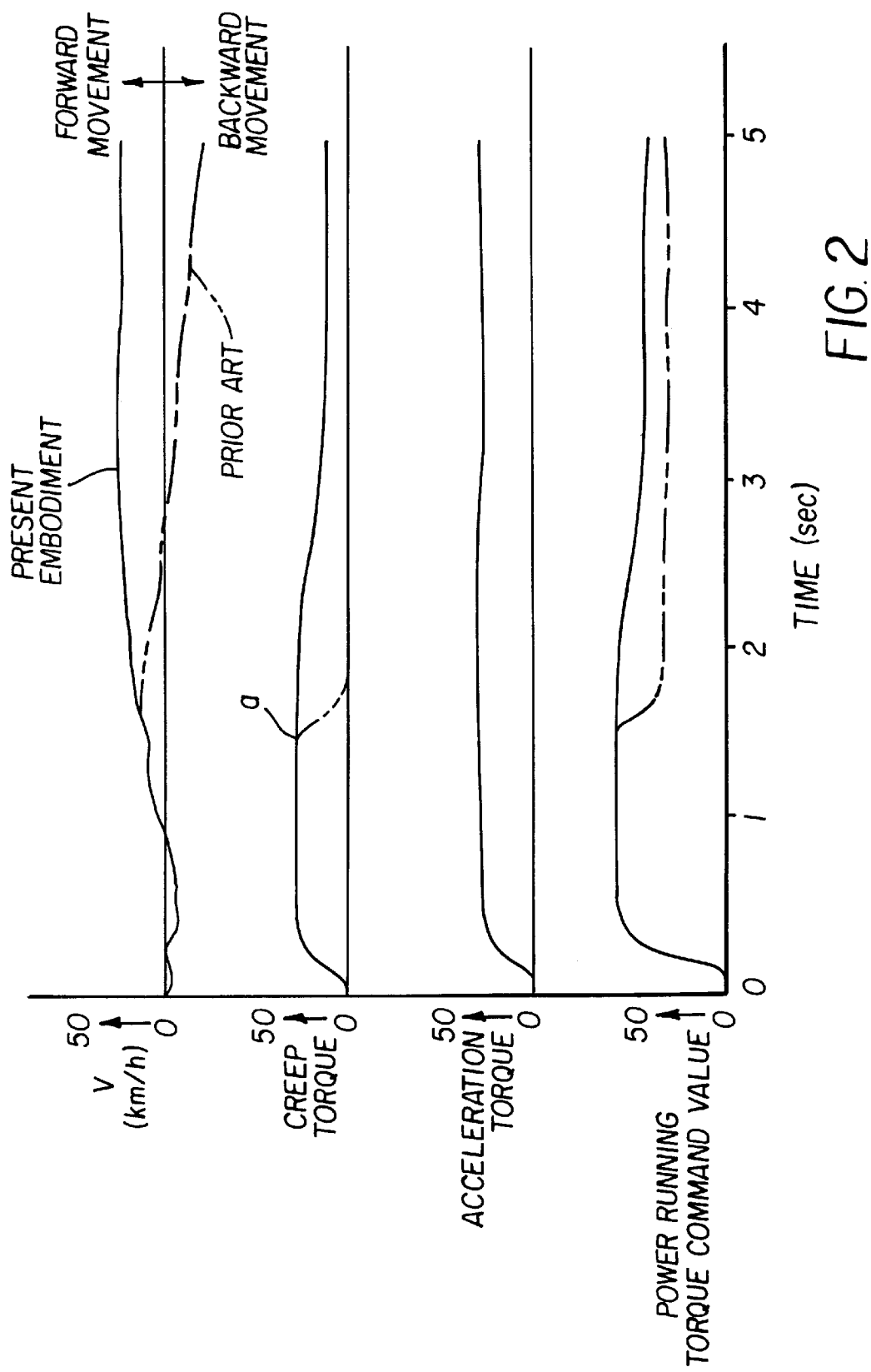
FIG. 2 is a time chart showing the comparison in the control status between an embodiment of the present invention and a prior art in the case where a vehicle is started on an uphill slope.

Referring to a solid line in FIG. 2, a description will be given of the case where the vehicle is started on, e.g., an uphill slope. Just before the start of the vehicle, the shift position is the P position or the N position (i.e., a non-running shift position), or the foot brake is strongly pressed on. Thus, the switch S is turned off without satisfying the condition relating to the shift position and the brake control input Brc. The creep torque is set at zero. More specifically, when the non-running position is set as the shift position and the driver does not intend to run the vehicle, or when the operation brake prevents the backward movement of the vehicle, the creeping phenomenon is considered to be unnecessary.

If the driver changes the shift position to the D position and loosens the pressing force against the foot brake in order to start the vehicle, the switch S is turned on when the brake control input Brc becomes less than 20% and a set value in the map is applied as the creep torque. This creep torque is set as the power running torque command value to thereby generate a vehicle driving force. When the driver changes the position of the foot from the brake pedal to the accelerator pedal in order to start the acceleration, the acceleration torque starts increasing from zero. The vehicle is started when the driving force exceeds a grade resistance of the uphill slope. The creeping phenomenon is caused while there remains a braking force of the foot brake (the brake control input is about 20%), This controls the backward movement of the vehicle to such an extent as to avoid a trouble when the driver changes the position of the foot from the brake pedal to the accelerator pedal. In other words, it is necessary to determine the brake control input Brc according to the weight of the vehicle and the like in order to cause the creeping phenomenon in a proper timing.

Thereafter, the shift position and the brake control input Brc keep satisfying the above condition, and thus, a value found by adding the creep torque to the acceleration torque is continuously set as the power running torque command value. When the vehicle speed V exceeds about 3 km/h, the creep torque is decreased at a fixed rate and finally becomes zero according to the characteristics of the map M2 (FIG. 2 shows the halfway of the decrease in the creep torque). Thereafter, the acceleration torque is substantially set as the power running torque command value, and the vehicle driving force is controlled according to the accelerator control input Acc.

As set forth hereinabove, the motor torque control device of the present embodiment sets a value, which is found by adding the creep torque to the acceleration torque, as the power running torque command value without switching the torque command from the creep torque to the acceleration torque, which is performed in various manners in the prior art. Therefore, the acceleration torque is raised immediately when the operation of the accelerator is started, and thereafter the torque command value reflects the acceleration torque. This enables the quick start of the vehicle and the natural acceleration. The torque command value reflects the creep torque after the start of the vehicle, and this prevents a sharp decrease in the prior art indicated by the alternate short and two long dashed line in FIG. 2. It is therefore possible to prevent the unprepared backward movement of the vehicle at the start on an uphill slope, and prevent the momentary decrease in the vehicle speed at the start on a level road. This enables the smooth acceleration of the vehicle. The motor torque control device of the present embodiment realizes the smooth and natural acceleration according to the operation of the accelerator at the start of the vehicle and the like.

It should be understood, however, that there is no intention to limit the invention to the present embodiment. For example, according to the present embodiment, the creep torque is decreased to zero according to the characteristics of the map 2 when the vehicle speed V exceeds 3 km/h. The characteristics of the map M2 are determined based on the knowledge that the creeping phenomenon is unnecessary if the vehicle speed is in the excess of 3 km/h; however, it is possible to modify the characteristics of the map M2.

According to the present embodiment, if the brake control input Brc is not less than 20% and the parking switch 16 is operated, the creeping phenomenon is determined as being unnecessary and the creep torque is set at zero by operating the switch S. This aims at reducing the unnecessary consumption of battery power, but the condition about the brake control input Brc and the parking brake should not necessarily be determined. For example, it is possible to omit the condition and cause the creeping phenomenon regardless of the operation of the brake when the running shift position is set as the shift position.

What is claimed is:

1. An electric vehicle comprising:
   a shift position sensing device for sensing a shift position of a transmission disposed between a motor and driving wheels;
   a vehicle speed sensing device for sensing a vehicle speed;
   an accelerator sensing device for sensing an accelerator control input;
   a creep torque setting device for setting creep torque in accordance with said vehicle speed sensed by a vehicle speed sensing device when said shift position sensing device senses a running shift position;
   an acceleration torque setting device for setting acceleration torque in accordance with the accelerator control input;
   a driving torque calculating device for calculating driving torque by adding the creep torque, which is set by said creep torque setting device, to the acceleration torque, which is set by said acceleration torque setting device; and
   a drive control device for running a motor in accordance with the driving torque calculated by said driving torque calculating device;
   wherein the creep torque setting device maintains the creep torque at a predetermined creep torque when the vehicle speed sensed by the vehicle speed sensing device is within a range between zero and a first predetermined vehicle speed; and
   wherein the creep torque setting device reduces the creep torque from the predetermined creep torque to zero as the vehicle speed sensed by the vehicle speed sensing device increases from the first predetermined vehicle speed to a second predetermined vehicle speed.

2. An electric vehicle according to claim 1, further comprising:
   a brake sensor for sensing a brake control input; and
   wherein said driving torque calculating device sets the creep torque at zero if the brake control input sensed by said brake sensor is not less than a predetermined value.

3. An electric vehicle according to claim 1, further comprising:
   a parking brake switch for sensing an operation of a parking brake; and
   wherein said driving torque calculating device sets the creep torque at zero in accordance with an output of said parking brake switch.

4. A method of operating an electric vehicle comprising:
   sensing a shift position of a transmission disposed between a motor and driving wheels with a shift position sensing device;
   sensing a vehicle speed with a vehicle speed sensing device;
   sensing an accelerator control input with an accelerator sensing device;
   setting creep torque in accordance with a vehicle speed sensed by said vehicle speed sensing device when said shift position sensing device senses a running shift position with a creep torque setting device;
   setting acceleration torque in accordance with the accelerator control input with an acceleration torque setting device;
   calculating driving torque by adding the creep torque, which is set by said creep torque setting device, to the acceleration torque, which is set by said acceleration torque setting device with a driving torque calculating device; and
   running a motor in accordance with the driving torque calculated by said driving torque calculating device with a drive control device;
   wherein the creep torque setting device maintains the creep torque at a predetermined creep torque when the vehicle speed sensed by the vehicle speed sensing device is within a range between zero and a first predetermined vehicle speed; and
   wherein the creep torque setting device reduces the creep torque from the predetermined creep torque to zero as the vehicle speed sensed by the vehicle speed sensing device increases from the first predetermined vehicle speed to a second predetermined vehicle speed.

5. A method according to claim 4, further comprising:
   sensing a brake control input with a brake sensor; and
   wherein said driving torque calculating device sets the creep torque at zero if the brake control input sensed by said brake sensor is not less than a predetermined value.

6. A method according to claim 4, further comprising:
   sensing an operation of a parking brake with a parking brake switch; and
   wherein said driving torque calculating device sets the creep torque at zero in accordance with an output of said parking brake switch.

* * * * *